United States Patent [19]
Young

[11] Patent Number: 5,349,850
[45] Date of Patent: Sep. 27, 1994

[54] INSTRUMENTATION LIGHT PROBE HOLDER

[75] Inventor: Joseph C. Young, Cincinnati, Ohio

[73] Assignee: General Electric Company, Cincinnati, Ohio

[21] Appl. No.: 978,600

[22] Filed: Nov. 19, 1992

[51] Int. Cl.$^5$ .......................................... G01M 15/00
[52] U.S. Cl. .................................................... 73/116
[58] Field of Search .................. 73/866.5, 117.3, 116, 73/35; 356/241, 73.1; 374/132, 130, 131, 144, 208; 385/12, 13, 53, 76, 77, 81; 123/613

[56] References Cited

U.S. PATENT DOCUMENTS

| | | | |
|---|---|---|---|
| 1,422,672 | 7/1922 | Goghlan | 374/144 |
| 2,838,935 | 6/1958 | DiCecio et al. | 374/208 |
| 4,011,017 | 3/1977 | Feuerstein et al. | 356/241 |
| 4,018,083 | 4/1977 | Hoffman | 73/70 |
| 4,484,469 | 11/1984 | Grover et al. | 73/117.3 |
| 4,495,810 | 1/1985 | Tessarzik et al. | 73/432 R |
| 4,545,238 | 10/1985 | Kinoshita et al. | 73/119 A |
| 4,643,022 | 2/1987 | Werlberger et al. | 73/117.3 |
| 4,665,740 | 5/1987 | Matsumoto et al. | 73/116 |
| 4,876,905 | 10/1989 | Callsen et al. | 73/866.5 |
| 4,907,456 | 3/1990 | Rozelle | 73/660 |
| 4,919,099 | 4/1990 | Extance et al. | 73/35 |
| 5,117,475 | 5/1992 | Young | 385/81 |

Primary Examiner—Robert Raevis
Attorney, Agent, or Firm—Jerome C. Squillaro; Bernard E. Shay

[57] ABSTRACT

An instrumentation light probe holder for use in observing and measuring operating characteristics of rotating blades of a gas turbine engine during engine operation or rotating components of a machine during operation is disclosed. The holder includes an elongated cylindrical member for insertion into an opening or bore formed radially through an annular casing of the gas turbine engine or machine housing. The cylindrical member has a hollow interior for receipt of an instrumentation light probe and a first end for insertion into the casing or housing and for holding an operating end of the probe at a selected set-back distance from the rotating blades or components. A grasping mechanism is provided for releasably holding the light probe in the cylindrical member.

14 Claims, 2 Drawing Sheets

INSTRUMENTATION LIGHT PROBE HOLDER

BACKGROUND OF THE INVENTION

The present invention relates to turbo-machinery and, more particularly, to an instrumentation light probe holder for use in observing and measuring operating characteristics of rotating blades or airfoils of a gas turbine engine during engine operation.

Gas turbine engines include a multiplicity of airfoils or blades arranged in rows extending radially from an axially aligned shaft. The rows of blades are rotatable in response to the force of high pressure gases flowing axially through the engine. Because of the complex shape of the blades and the forces and stresses exerted on the blades during engine operation, it is desirable to observe the blades during engine operation for the purposes of measuring operating characteristics of the blade, such as optical blade vibration, axial displacement of the blade, blade untwist and the like.

A currently used fiber optic light probe has one end which is threaded to permit screwing into a matingly threaded opening through a casing of a gas turbine engine to provide illumination of an end-on view of the engine's passing blade tips and to also collect light reflected from the passing blade tips. These light probes are typically about 20 feet long from the end screwed into the engine casing to an opposite end which is bifurcated to allow a portion of the optical fibers to be connected to a light source and the remaining optical fibers to be connected to a photodetector for the purpose of measuring blade vibration, blade untwist, axial displacement or other blade operating parameters or characteristics. A lock nut disposed around the threaded portion of the light probe may be tightened against the casing to secure the one end of the light probe in the casing.

One disadvantage of this probe is that the entire 20 foot length of the probe must be rotated, preferably while the probe is laid out substantially in a straight line, through a number of turns necessary to install or remove the probe, or to move the probe to a new observation location. For example, if the probe end is threaded at #10-32 threads per inch (TPI), 32 rotations would be required to insert or remove the probe from a 1 inch thick casing. Additionally, the probe may be routed around and over the engine and tie wrapped at various intervals to secure it. These tie wraps would, therefore, also have to be removed if the probe is removed or moved to a new location.

Another disadvantage is that the installation of each new probe or relocation of a probe requires that the probe be inserted and set to a proper "set-back" position relative to the passing blade tips to prevent the probe from interfering with the rotating blades which could potentially damage the probe and/or the blades.

A further disadvantage is that these probes cannot be quickly and easily removed for cleaning or as previously discussed relocated to another observation location.

It is, accordingly, a primary object of the present invention to provide a novel instrumentation light probe holder which is not subject to the foregoing disadvantages.

It is another object of the present invention to provide a novel light probe holder which does not require resetting of the set-back distance from the blade each time a new light probe is installed or the probe is moved to a new location.

It is a further object of the present invention to provide a novel light probe holder which permits faster and easier relocation of light probes or cleaning of the light probes without the need for test personnel having to climb into the bell mouth of the engine.

These and other objects of the invention, together with features and advantages thereof, will become apparent from the following detailed specification when read with the accompanying drawings in which like reference numerals refer to like elements.

SUMMARY OF THE INVENTION

In accordance with the present invention, an instrumentation light probe holder, for use in observing and measuring operating characteristics of rotating blades of a gas turbine engine or rotating components of machinery during operation of the engine or machine, includes an elongated cylindrical member for insertion into an opening formed radially through an annular casing of the engine or machine housing. The cylindrical member has a hollow interior for receipt of an instrumentation light probe and a first end for insertion into the casing or housing and for holding an operating end of the light probe at a selected set-back distance from the rotating blades or internal rotating machine components. A locking or retaining arrangement is provided to maintain the cylindrical member at a predetermined depth in the casing or housing to position the operating end of the light probe at the selected set-back distance from the rotating blades or components, and a compressible ferrule and nut combination is provided for releasably grasping or holding the light probe in the cylindrical member.

DETAILED DESCRIPTION OF THE PREFERRED EMBODIMENTS

Figure 1:
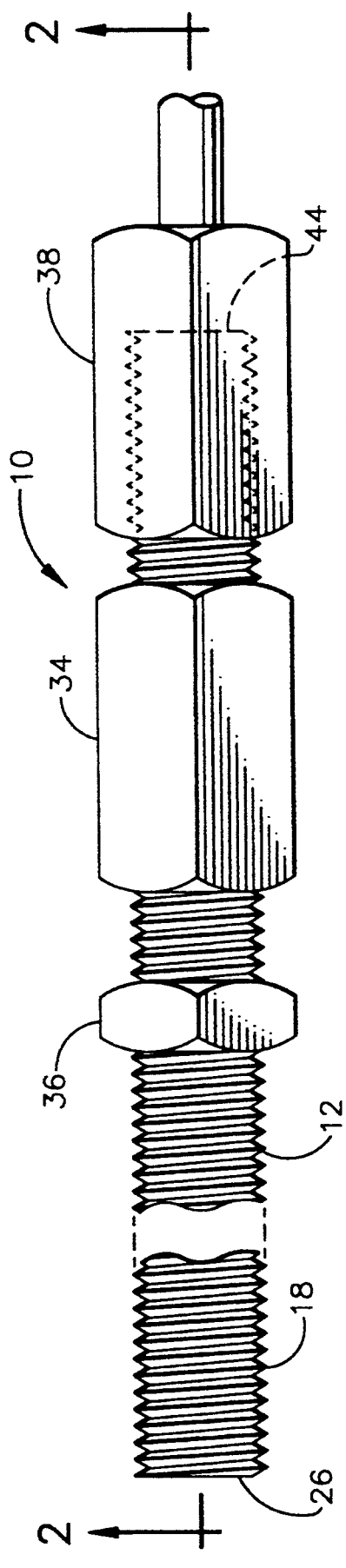
FIG. 1 is a side elevation view of an instrumentation light probe holder in accordance with the present invention.
Figure 2:
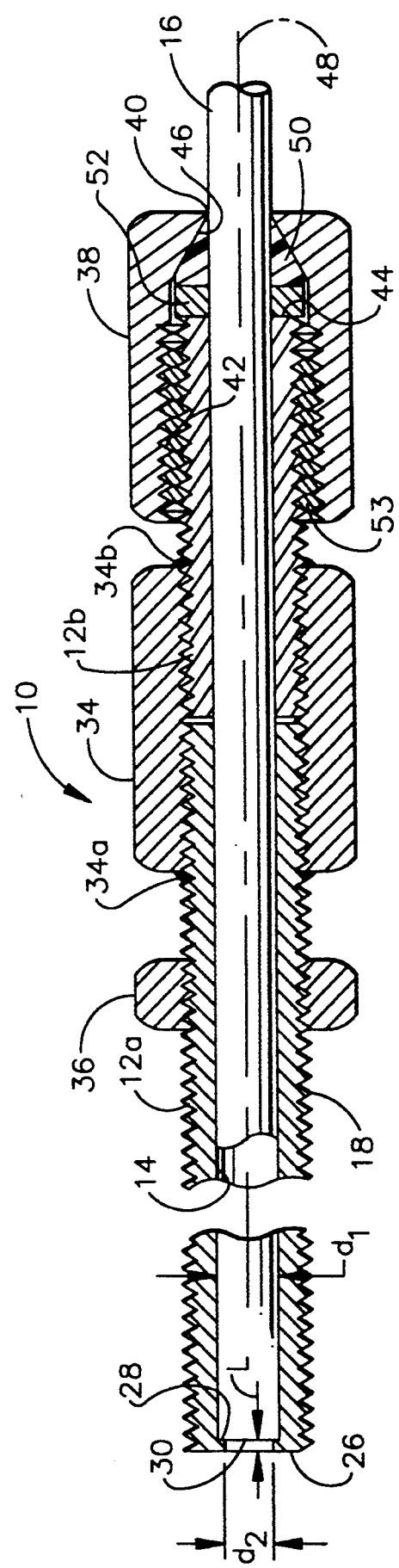
FIG. 2 is a cross-sectional view of the instrumentation light probe holder of FIG. 1 taken along lines 2—2 with a light probe retained therein.
Figure 3:
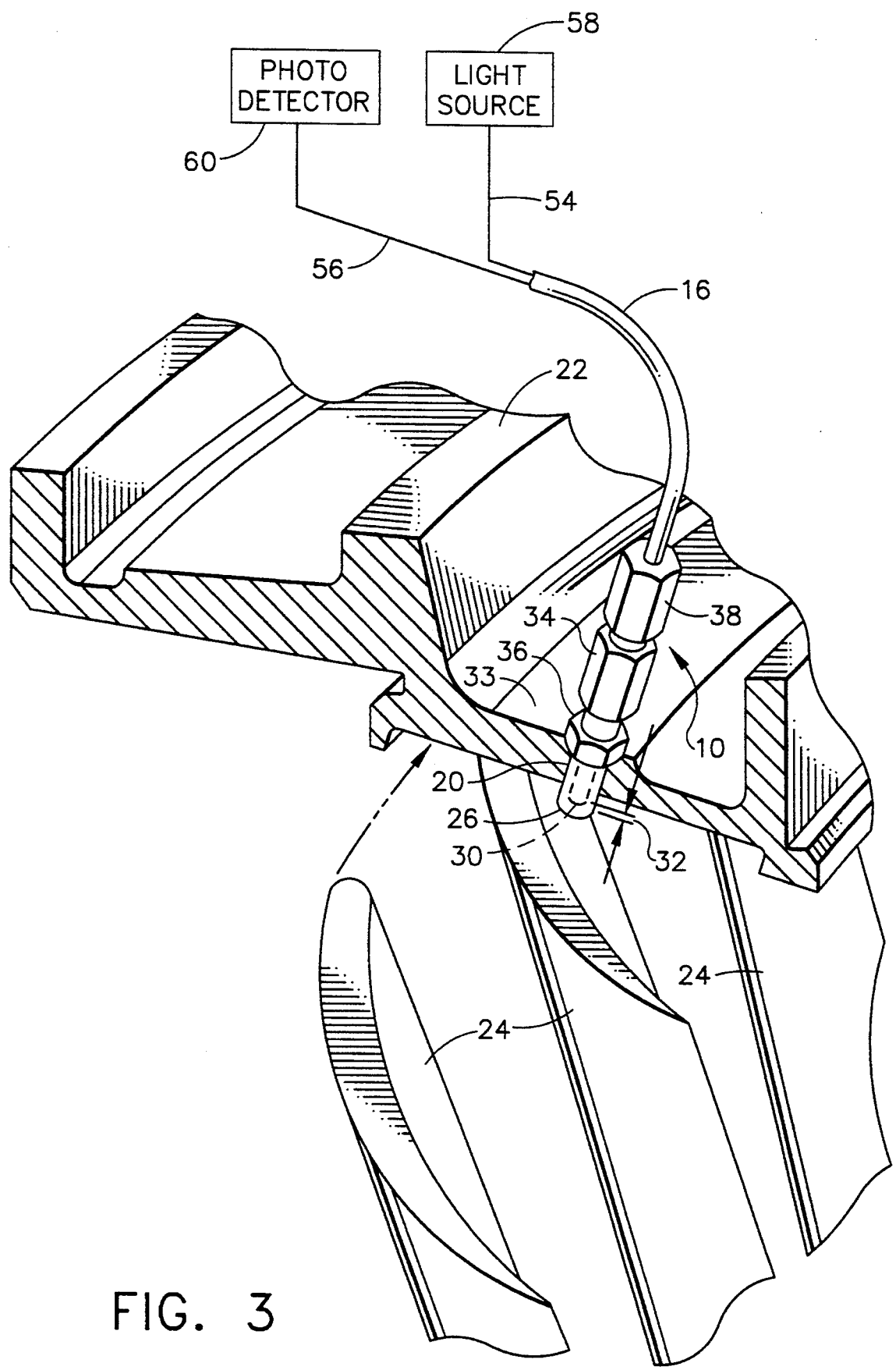
FIG. 3 is a partial cross-sectional perspective view of a gas turbine engine casing with a light probe holder in accordance with the present invention inserted into the casing with a light probe disposed therein for observing the rotating airfoils.

Referring initially to FIGS. 1 and 2, the instrumentation light probe holder 10 includes an elongated cylindrical member 12 which has a hollow interior 14 in which a light probe 16 may reside and a threaded exterior portion 18 for insertion into a matingly threaded opening or bore 20 formed radially through an annular casing 22 of a gas turbine engine, as best shown in FIG. 3. The cylindrical member 12 may be formed from two separate portions 12a and 12b to facilitate drilling the hollow interior or channel 14 in which the light probe 16 is disposed for observing or monitoring the rotating blades 24 or airfoils (FIG. 3).

The elongated cylindrical member 12 may be formed from stainless steel rolled thread stock that is drilled and flat-bottom reamed through its axis at a predetermined diameter $d_1$ sufficient to accommodate the light probe 16 and to permit it to be slidably inserted and removed from the cylindrical member 12. Substantially the entire length of cylindrical member 12 is drilled and flat-bottom reamed except for a selected length "L" at an insertion end 26 of the cylindrical member 12, which is inserted or screwed into the opening 20 formed through the engine casing 22. The selected length L may be about 0.010". The probe holder insertion end 26 is drilled through at a predetermined diameter $d_2$ that is smaller than the diameter $d_1$ of cylindrical member 12. The smaller diameter $d_2$ at the insertion end 26 forms an annular lip or stop 28 against which the perimeter of an operating end 30 of the probe 16 will abut when probe 16 is inserted into the cylindrical member 12 of probe holder 10. The annular lip or stop 28 also defines a window through which the operating end 30 of probe 16 can illuminate the rotating blades 24 and also receive reflected light from the blades 24. The stop 28 also serves to retain the probe operating end 30 at a selected set-back distance 32 (FIG. 3) or clearance from the tips of the rotating blades 24 when the light probe holder 10 is screwed into the opening 20 in the annular casing 22 to a predetermined depth as measured from an outer surface 33 of casing 22, which provides the proper set-back distance 32.

An elongated hex nut 34 which is matingly threaded to match the threaded exterior portion 18 of cylindrical member 12 is provided intermediate the opposite ends of cylindrical member 12 to provide wrenching surfaces for attachment of a hand tool (not shown) for insertion of the probe holder 10 into the opening 20 in the casing 22 or for removal of the probe holder 10 from the casing 22 if desired. If the cylindrical member 12 is formed in two portions 12a and 12b, the elongated hex nut 34 also serves to join portions 12a and 12b together. The hex nut 34 is brazed at opposite ends 34a and 34b to hold the hex nut 34 in place on cylindrical member 12 and to prevent it from advancing along the threaded exterior portion 18 of member 12 as the probe holder 10 is rotated by a hand tool attached to hex nut 34 to screw the probe holder 10 into the opening 20 to the predetermined depth to provide the proper set-back distance 32 or to back probe holder 10 out of the opening 20.

The probe holder 10 further includes a second hex nut 36 disposed between the elongated hex nut 34 and the insertion end 26 of the probe holder 10. In operation, the hex nut 36 is tightened against the engine casing 22, as best shown in FIG. 3 to retain the probe holder 10 within the opening 20 and to retain the insertion end 26 at the predetermined depth to provide the appropriate set-back distance 32 or clearance from the rotating blades 24.

In accordance with the present invention, the light probe holder 10 further includes a cap nut 38 and mechanism residing therein for releasably grasping or holding the light probe 16 in the probe holder 10. The cap nut 38 has an interior bore 40 through which the light probe 16 may pass. The cap nut 38 has a threaded interior portion 42 at one end thereof for attachment onto a matingly threaded second end 44 or exterior end of cylindrical member 12, opposite to the insertion end 26, for attaching the cap nut 38 onto the cylindrical member 12. The cap nut 38 also has a tapered portion 46 at an end opposite to threaded portion 42. The tapered portion 46 may have about a 30° taper relative to the cylindrical axis 48 of the probe holder 10. A resilient ferrule 50 is disposed within the tapered portion 46 and is matingly tapered to abut portion 46. A thrust washer 52 is disposed between the second end 44 of cylindrical member 12 and the ferrule 50 when the cap nut 38 is screwed onto the second end 44.

In operation, when the probe 16 is inserted into probe holder 10 and abuts stop 28 the hex nut 38 is screwed onto second end 44 of cylindrical member 12 and is tightened to cause the second end 44 to apply an axial thrust force to the washer 52 which transfers the axial force to the ferrule 50. The ferrule 50 is then pushed against the tapered portion 46 which causes the ferrule 50 to compress around the probe 16 and to releasably retain or lock the probe 16 in position in the holder 10. The ferrule 50 will return to its uncompressed position if the cap nut 38 is backed off or unscrewed to permit removal of the probe 16 from the holder 10.

The ferrule 50 may be made from a compressible, resilient material, such as nylon or the like, or may be a compressible metal if the probe 16 is to be used in a high temperature environment. The compressible, resilient ferrule 50 should release the light probe 16 to some extent if the cap nut 38 is untightened or backed off slightly to permit removal of the probe 16 from the holder 10.

A threaded locking insert 53, such as a HELI-COIL® as manufactured by HELI-COIL PRODUCTS a division of Mite Corporation of Danbury, Conn., or a similar mechanism may be disposed in the threaded interior portion 42 of cap nut 38 to prevent the cap nut 38 from vibrating loose during engine operation and to also retain the thrust washer 52 and the ferrule 50 in position in the tapered portion 46 when the cap nut 38 is removed from the probe holder 10 for any reason. This feature permits the probe holder 10 to be used without the need for lock-wiring, RTV or nichrome strapping to secure the nut 30 and the probe 16 in place during engine operation to prevent foreign object damage (FOD) to the operating engine. The threaded locking insert 53 is preferably inserted into the cap nut 38 with a clearance of about a sixteenth of an inch between it and the thrust washer 52 to permit clearance for removal of an installation tang from the locking insert 53, if the locking insert 53 is a HELI-COIL® or similar locking insert which has an installation tang, or to provide clearance for removal of any such installation mechanism.

Referring to FIG. 3, the probe holder 10 may be inserted independently into the opening 20 formed in the engine casing 22 to a depth to provide the proper set-back distance 32. The hex nut 36 is then tightened against the casing 22 to retain the probe holder 10 in the opening 20 at the predetermined depth to provide the proper set-back distance for the light probe operating end 30. The light probe operating end 30 is then inserted through the bore 40 (FIG. 2) of cap nut 38 and into the hollow interior or channel 14 of cylindrical member 12 until the operating end 30 abuts the probe stop 28. With the operating end 30 of probe 16 abutting the stop 28, the cap nut 38 is tightened onto the second or exterior end 44 of cylindrical member 12 to cause the ferrule 50 to compress around probe 16 and to lock the probe 16 within the holder 10, as previously described.

The instrumentation light probe 16 may be a fiber optic probe with a stainless steel sheath and bifurcated external ends 54 and 56, such as a Fiber Optics Components model #00465 probe as manufactured by Fiber Optics Components, Inc. of Fitchburg, Mass. The probe external ends 54 and 56 are respectively coupled to a light source 58 and a photodetector 60, camera or the like. The light source 58 supplies light through the probe 16 to the probe operating end 30. The light passes through the window defined by stop 28 to illuminate the rotating blades 24, and the light reflected from the rotating blades 24 is received through the window by the operating end 30 and is transmitted along the fiber optics of light probe 16 to the photodetector 60, camera or the like where the received light signals may be used to measure operating characteristics of the blades 24, such as blade vibration, axial displacement of the blades and change in blade contour or untwist of the blade caused by centrifugal forces.

The present invention thus provides a probe holder 10 which can be screwed into an opening 20 radially formed in a gas turbine engine casing 22 without the lengthy light probe 16 attached. The light probe holder 10 may remain installed in the engine casing 22 disposed at the proper depth to provide the appropriate set-back distance 32 and the instrumentation light probe 16 may be moved from one holder 10 to another reasonably efficiently without the set-back distance 32 having to be adjusted each time. Thus, the probes can be more easily installed in close proximity to one another, can be efficiently removed for cleaning or replacement and can be easily moved from one location to another on the casing 22.

While the present invention has been described primarily with respect to a light probe holder for insertion into the casing of a gas turbine engine for monitoring and observing the rotating turbine blades within the casing, those skilled in the art will recognize that the principles of the present invention may be easily modified or adapted to other applications for efficient interchangeability of probes. Therefore, it will be readily understood by those skilled in the art that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. An instrumentation light probe holder for use in observing and measuring operating characteristics of rotating blades of a gas turbine engine during engine operation, said probe holder comprising:
    an elongated cylindrical member having a threaded exterior portion for insertion into a matingly threaded opening formed radially through an annular casing of a gas turbine engine, said cylindrical member having a hollow interior for receipt of an instrumentation light probe and a first end for insertion into the casing;
    means for retaining said cylindrical member within said opening and for retaining said first end at a predetermined depth as measured from an outer surface of said casing;
    stop means formed at said first end for abutting an operating end of the probe to prevent the operating end from extending beyond said first end, said means for retaining and said stop means combining to position and retain the operating end of the probe at a selected set-back distance from the rotating blades;
    means for releasably grasping the light probe, said light probe grasping means releasably locking the light probe in position in said cylindrical member.

2. The light probe holder of claim 1, wherein said retaining means is a nut threadedly received on said cylindrical member, said nut being tightened against the annual casing when said cylindrical member is screwed into the annular casing to said predetermined depth to hold said first end at said predetermined depth and to retain the probe operating end at said selected set-back distance from the rotating blade tips.

3. The light probe holder of claim 1, wherein said stop means is an annular lip which defines a window through which said light probe operating end transmits light and receives reflected light.

4. The light probe holder of claim 1, wherein said light probe grasping means comprises:
    a cap nut having an interior bore through which the light probe passes, said bore having a threaded interior portion at one end thereof for attachment onto a matingly threaded second end of said cylindrical member and said bore having a tapered portion at an opposite end;
    a resilient ferrule disposed in said tapered portion; and
    a thrust washer disposed between said cylindrical member second end and said ferrule when said cap nut is screwed onto said cylindrical member second end to cause said second end to apply an axial thrust force to said washer which transfers the axial thrust force to said ferrule, wherein said ferrule is pushed against said tapered portion to cause said ferrule to compress around the probe and releasably hold the probe in position in said holder, said ferrule returning to an uncompressed position when said cap nut is backed off to permit removal of the probe from the holder.

5. The light probe holder of claim 4, wherein said light probe grasping means further comprises means for holding said cap nut on said cylindrical member second end and for retaining both said thrust washer and said ferrule within said cap nut.

6. The light probe holder of claim 5, wherein said holding means is a threaded locking insert disposed within said threaded interior portion of said cap nut.

7. The light probe holder of claim 6, wherein said locking insert is disposed at a predetermined distance from said thrust washer.

8. The light probe holder of claim 1, further comprising means for attaching a hand tool to facilitate screwing said cylindrical member into the threaded opening of the gas turbine engine casing.

9. The light probe holder of claim 1, wherein said elongated cylindrical member has a first portion and a second portion joined together by an elongated hex nut which provides wrenching surfaces to facilitate screwing said cylindrical member into the threaded opening of the gas turbine engine casing, each end of said hex nut being respectively brazed to said first and second portions.

10. An instrumentation light probe holder for use in observing and measuring operating characteristics of rotating components within a housing of a machine during operation of the machine, said probe holder comprising:

an elongated cylindrical member for insertion into an opening formed through the housing of the machine, said cylindrical member having a hollow interior for receipt of an instrumentation light probe and an insertion end for insertion into the housing;

means for retaining said cylindrical member within said opening and for retaining said insertion end at a predetermined depth as measured from an outer surface of said housing;

stop means formed at said insertion end for abutting an operating end of the probe to prevent the operating end from extending beyond said insertion end, said means for retaining and said stop means combining to position and retain the operating end of the probe at a selected set-back distance from the rotating components;

means for releasably grasping the light probe, said light probe grasping means releasably locking the light probe in position in said cylindrical member.

11. The light probe holder of claim 10, wherein said cylindrical member has a threaded exterior portion and said housing opening is matingly threaded to receive said threaded exterior portion, and wherein said retaining means is a nut threadedly received on said cylindrical member, said nut being tightened against the housing when said cylindrical member is inserted into the housing to said predetermined depth to hold said insertion end at said predetermined depth and to retain the probe operating end at said selected set-back distance from the rotating components.

12. The light probe holder of claim 10, wherein said stop means is an annular lip which defines a window through which said light probe operating end transmits light and receives reflected light.

13. The light probe holder of claim 10, wherein said light probe grasping means comprises:

a cap nut having an interior bore through which the light probe passes, said bore having a threaded interior portion at one end thereof for attachment onto a matingly threaded outer end of said cylindrical member and said bore having a tapered portion at an opposite end;

a resilient ferrule disposed in said tapered portion; and a thrust washer disposed between said cylindrical member outer end and said ferrule when said cap nut is screwed onto said cylindrical member outer end to cause said outer end to apply an axial thrust force to said washer which transfers the axial force to said ferrule, wherein said ferrule is pushed against said tapered portion to cause said ferrule to compress around the probe and releasably hold the probe in position in said holder, said ferrule returning to an uncompressed position when said cap nut is backed off to permit removal of the probe from the holder.

14. The light probe holder of claim 13, wherein said light probe grasping means further comprises a locking insert to retain said cap nut on said cylindrical member outer end and to retain both said thrust washer and said ferrule within said cap nut.

* * * * *